United States Patent
Horng et al.

(10) Patent No.: US 6,819,068 B2
(45) Date of Patent: Nov. 16, 2004

(54) BRUSHLESS DC MOTOR HAVING DUAL HALL SENSOR

(75) Inventors: Alex Horng, Kaohsiung (TW);
Yin-Rong Hong, Kaohsiung (TW);
Ching-Sheng Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 22 days.

(21) Appl. No.: 10/247,490

(22) Filed: Sep. 20, 2002

(65) Prior Publication Data

US 2004/0056613 A1 Mar. 25, 2004

(51) Int. Cl.$^7$ ................................ H02P 3/08; H02P 5/06
(52) U.S. Cl. ................ 318/254; 318/138; 318/439; 318/430; 318/432; 318/434; 318/700; 310/67 R; 310/68 B
(58) Field of Search ................ 318/430–434, 318/700, 138, 254, 439; 310/67 R, 68 B

(56) References Cited

U.S. PATENT DOCUMENTS

| | | | | |
|---|---|---|---|---|
| 4,507,591 A | * | 3/1985 | Kelleher | 318/254 |
| 5,402,024 A | * | 3/1995 | Watanabe et al. | 310/156.12 |
| 5,821,710 A | * | 10/1998 | Masuzawa et al. | 318/254 |
| 6,020,700 A | * | 2/2000 | Tien | 318/254 |
| 6,034,459 A | * | 3/2000 | Matsunobu et al. | 310/156.38 |
| 6,307,337 B1 | * | 10/2001 | Nelson | 318/254 |
| 6,320,288 B1 | * | 11/2001 | Suzuki et al. | 310/68 B |
| 6,476,526 B1 | * | 11/2002 | Hsieh | 310/68 B |

* cited by examiner

*Primary Examiner*—Michael Sherry
*Assistant Examiner*—Tyrone Smith
(74) *Attorney, Agent, or Firm*—Bacon & Thomas, PLLC

(57) ABSTRACT

A brushless dc motor mainly comprises a stator, a first Hall sensor, a second Hall sensor, and a rotor. The stator, which comprises a plurality of magnet poles, is axially combined with the rotor which comprises a driver permanent magnet and a frequency permanent magnet. The driver permanent magnet is adapted to rotate the rotor by means of being detected by the first Hall sensor while the frequency permanent magnet with predetermined pole count adapted to generate the rotational frequency of the rotor by means of being detected by the second Hall sensor.

8 Claims, 6 Drawing Sheets

BRUSHLESS DC MOTOR HAVING DUAL HALL SENSOR

BACKGROUND OF THE INVENTION

1. Field of the Invention

The present invention is related to a brushless dc motor and more particularly to the brushless dc motor having dual Hall sensors adapted to detect two permanent magnets of a rotor, so that the motor is capable of both alternatively changing the magnetic field of a stator and outputting a predetermined frequency specification of the motor speed.

2. Description of the Related Art

A conventional brushless dc fan motor outputs its rotational frequency to a computer system for reference thereby adjusting the motor speed to be increased or decreased. In outputting rotational frequency, Hall voltage signals inputted from a Hall sensor of the motor are adapted to be a reference for the rotational frequency. In design, the permanent magnet of the motor rotor is limited due to the pole count of the motor stator, four or eight poles for example. Thus, as the Hall sensor detects the speed fo the motor rotor the rotational frequency is determined by the pole count.

To output a predetermined specific rotational frequency applied to the computer system, the motor controller must include a frequency divider so that the motor of various pole counts is capable of outputting a predetermined specific rotational frequency of the motor speed.

Referring to FIG. 1, a circuitry diagram of a conventional brushless dc motor mainly includes a driver circuit 10, a sensor 11, a coil 12, and a frequency divider IC 13. Referring to FIG. 2, a motor comprises a rotor 14, a stator 15, and a driver member 16. The rotor 14 comprises a permanent magnet 141 surrounding an outer circumference of the stator 15, and a shaft 142 axially combined with the stator 15. The stator 15 comprises an axial tube 151 connected to the driver member 16 which is comprised of the driver circuit 10 and the frequency divider IC 13, as shown in FIG. 1. The driver member 16 further comprise the sensor 11 electrically connected to the driver circuit 10 which may actuate the coil 12 alternatively according to the signals of the sensor 11. Connected to the sensor 11, the frequency divider IC 13 is adapted to convert the signals of the sensor 11 into output of a predetermined specific frequency available for a computer system.

However, the problem is that the frequency divider IC is more expensive and increases overall cost of the motor. There is a need for an inexpensive member to replace the frequency divider IC.

The present invention intends to provide a brushless dc motor utilizing inexpensive members of a sensor associated with a frequency permanent magnet to replace an expensive member of frequency divider IC in such a way to mitigate and overcome the above problem.

SUMMARY OF THE INVENTION

The primary objective of the this invention is to provide a brushless dc motor having dual Hall sensors, which are inexpensive, to replace the conventional frequency divider IC, so that the overall cost of the motor is reduced.

The secondary objective of this invention is to provide the brushless dc motor having dual Hall sensors associated with a driver permanent magnet and a frequency permanent magnet respectively, which is adapted to drive the motor and generate a predetermined specific rotational frequency available for a computer system by detecting alternation of the opposite magnetic poles of the respective driver and frequency permanent magnets.

The brushless dc motor in accordance with the present invention mainly comprises a stator, a first Hall sensor, a second Hall sensor, and a rotor. The stator, which comprises a plurality of magnet poles, is axially combined with the rotor which comprises a driver permanent magnet and a frequency permanent magnet. The driver permanent magnet is adapted to rotate the rotor by means of being detected by the first Hall sensor while the frequency permanent magnet with predetermined pole count adapted to generate the rotational frequency of the rotor by means of being detected by the second Hall sensor.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
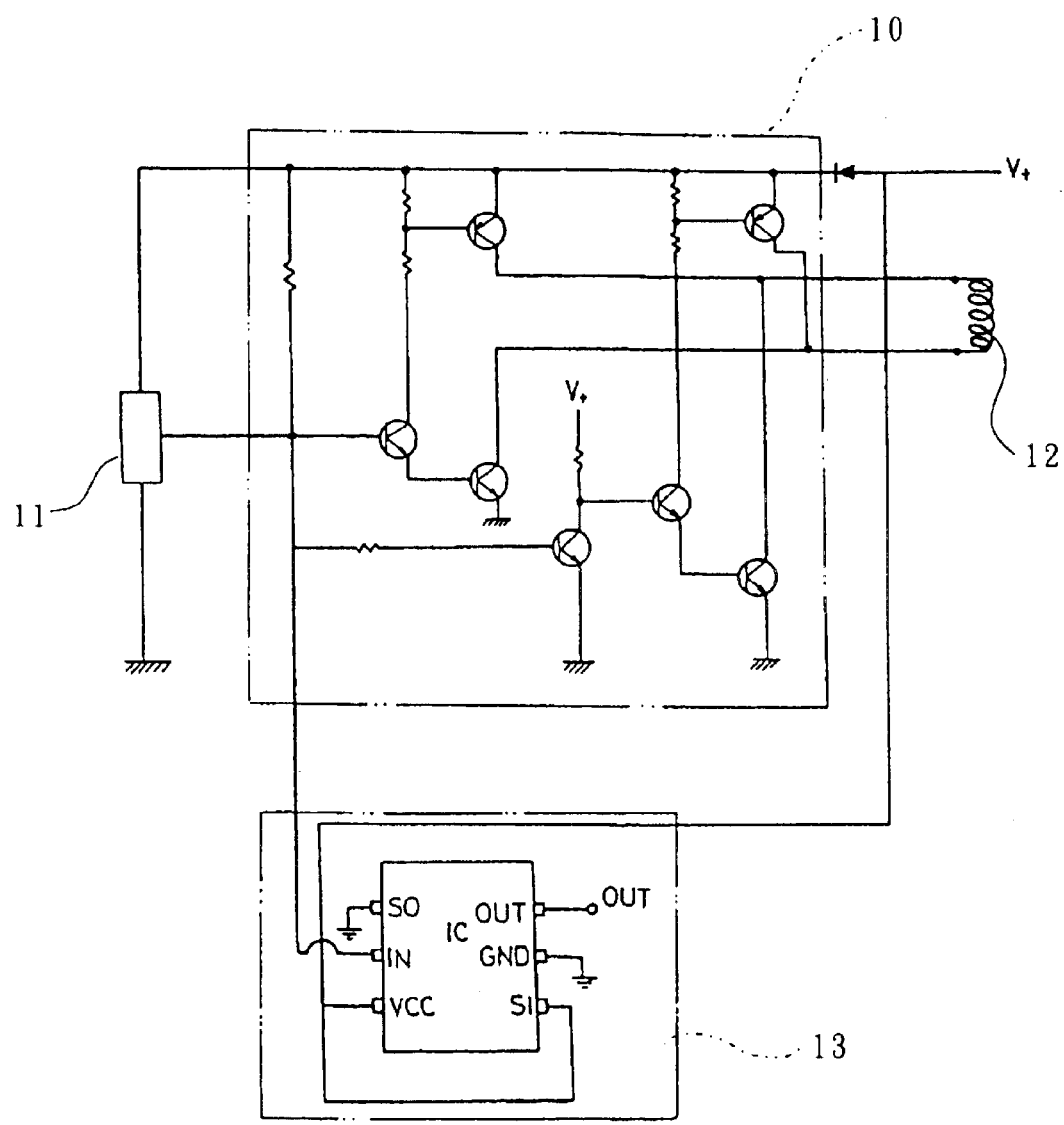
FIG. 1 is a circuit diagram of a conventional brushless dc motor in accordance with a prior art.

Referring now to the drawings, there are two embodiments of the present invention shown therein, all of which include generally a primary stator member and a secondary rotor member.

Figure 3:
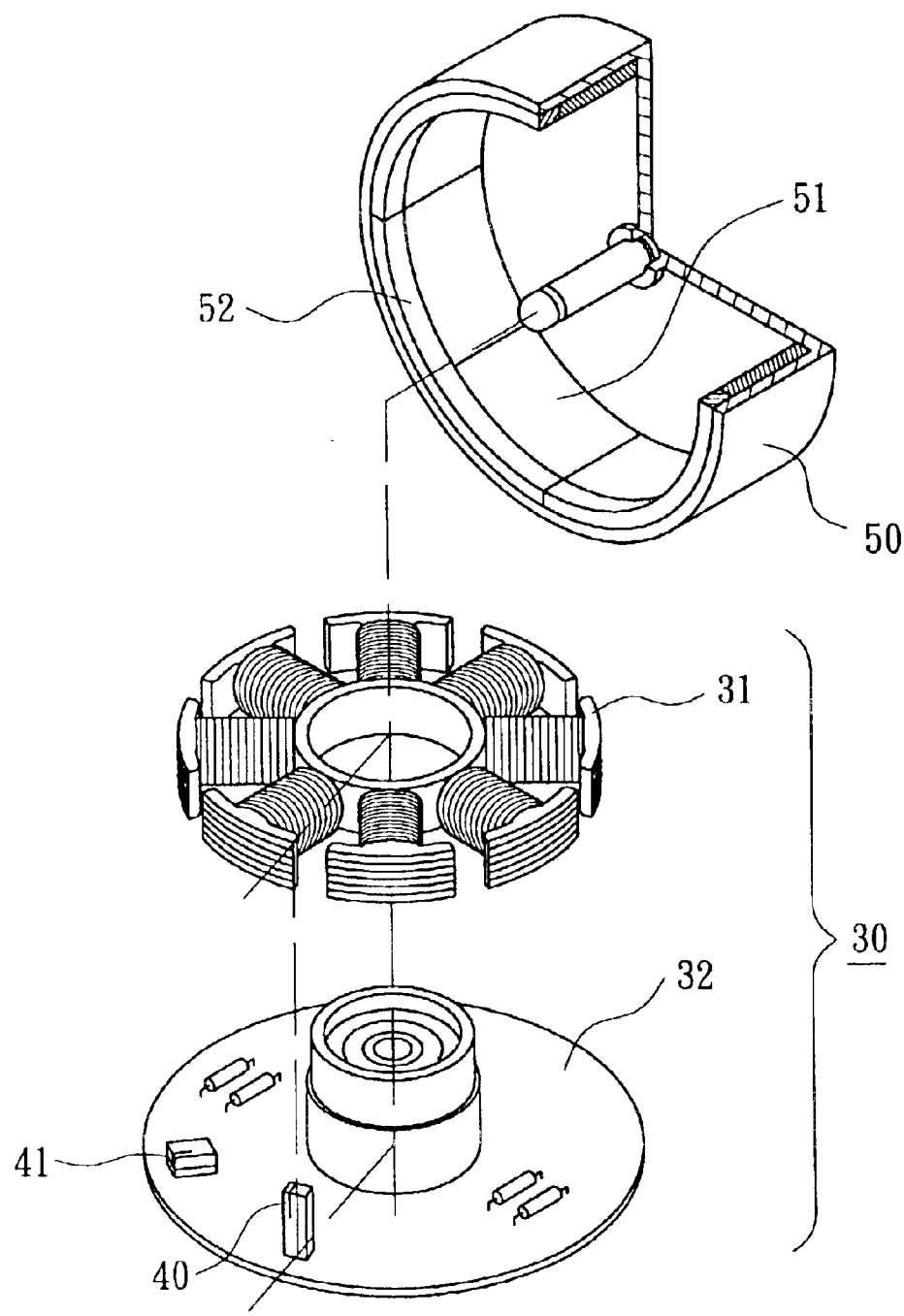
FIG. 3 is an exploded perspective view of a brushless dc motor having dual Hall sensors in accordance with a first embodiment of the present invention.
Figure 4:
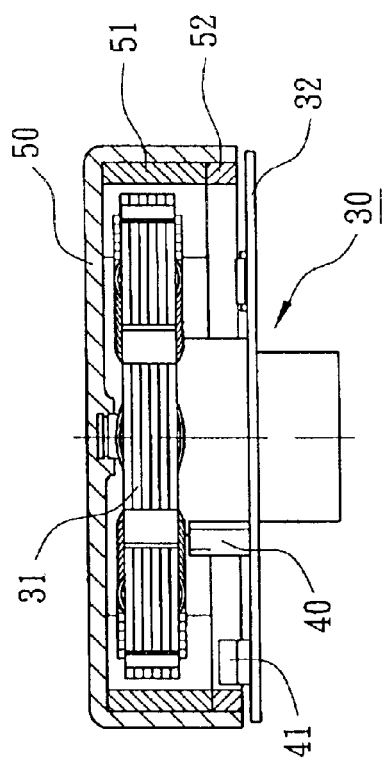
FIG. 4 is a sectional view of the brushless dc motor having dual Hall sensor in accordance with the first embodiment of the present invention.

Referring initially to FIGS. 3 and 4, a brushless dc motor in accordance with the first embodiment includes a stator designated as numeral 30, a first Hall sensor designated as numeral 40, a second Hall sensor designated as numeral 41, and a rotor designated as numeral 50. In assembling, the stator 30 is axially combined with the rotor 50. The stator 30, a radial winding stator, has eight poles 31, and a driver member 32. In addition, the poles 31 are equally spaced and radially extended from the outer circumference of the stator 30.

Referring again to FIGS. 3 and 4, the first and second Hall sensors 40 and 41 are Hall IC members mechanically and electrically connected to the driver member 32. A topmost position of the first Hall sensor 40 is higher than that of the second Hall sensor 41 with respect to a reference surface of the driver member 32. To this end, the first Hall sensor 40 is fixed upright and horizontal with respect to the surface of the driver member 32. Meanwhile, the second Hall sensor 41 is radially aligned with the rotor 50 after assembly.

Figure 5:
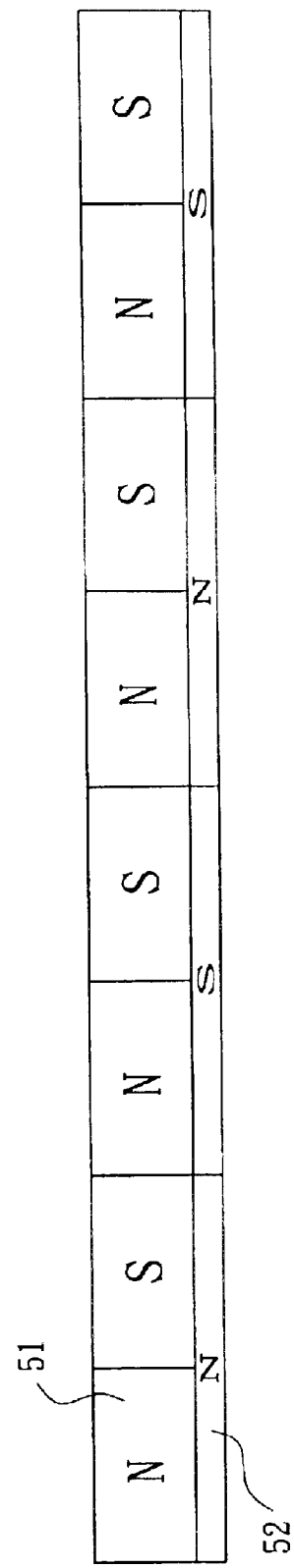
FIG. 5 is a schematic view of a permanent magnet a rotor of the brushless dc motor in accordance with the present invention.

Referring to FIGS. 3 through 5, the rotor 50 comprises a driver permanent magnet 51 and a frequency permanent magnet 52 which are commonly surrounding an inner circumference of the rotor 50 aligned with the first and second Hall sensors 40 and 41 respectively. The first Hall sensor 40 is adapted to detect the driver permanent magnet 51 and then to output inducted signals, so as to alternatively actuate the poles 31 of the stator 30. Similarly, the second Hall sensor 41 is adapted to detect the frequency permanent magnet 52 and then to output inducted signals, so as to output accurate operational status of the rotor 50 to a computer system.

Referring again to FIGS. 3 through 5, the pole count of the driver permanent magnet 51 is preferably identical with that of the poles 31, so as to repulse each other to rotate the rotor 50. By contrast, the pole count of the frequency permanent magnet 52, four poles for example, is predetermined and adjustable depending upon necessary pole count.

Referring back to FIG. 3, when the rotor 50 is rotated around the stator 30, the first Hall sensor 40 is detected the change of the driver permanent magnet 51 while passing it. Synchronously, the second Hall sensor 41 is detected the change of the frequency permanent sensor 52 so as to output accurate operational status of the rotor 50 to a computer system.

Figure 6:
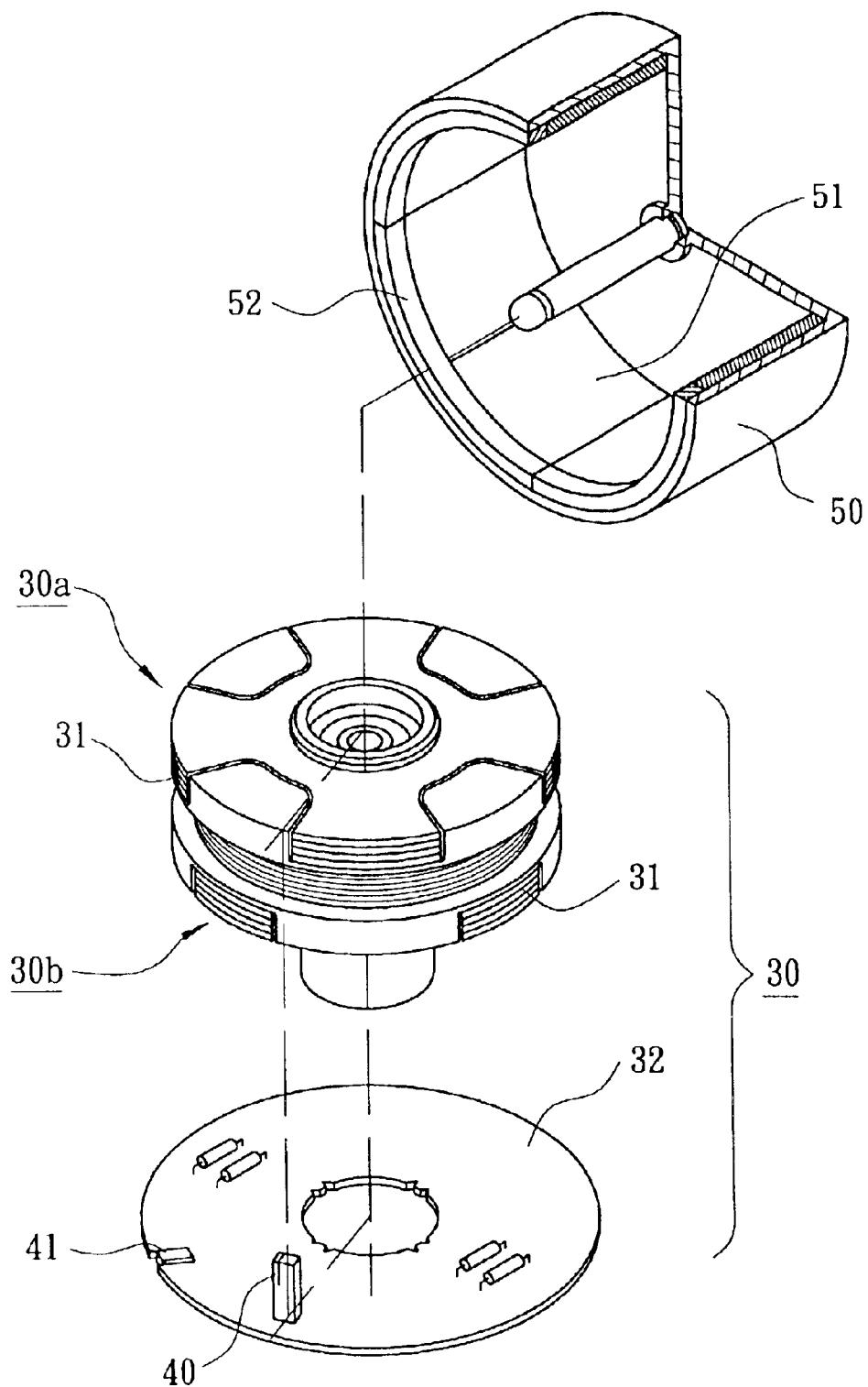
FIG. 6 is an exploded perspective view of a brushless dc motor having dual Hall sensor in accordance with a second embodiment of the present invention.
Figure 7:
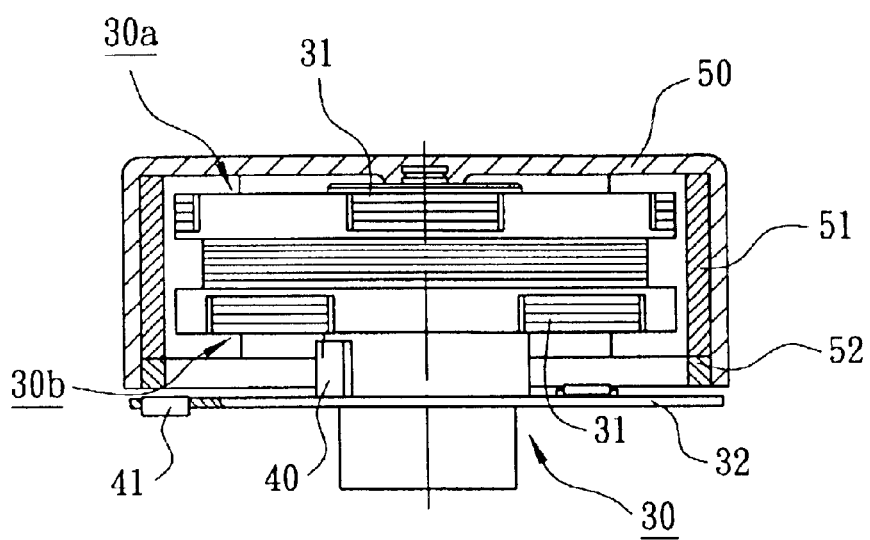
FIG. 7 is a sectional view of the brushless dc motor having dual Hall sensors in accordance with the second embodiment of the present invention.

Referring to FIGS. 6 and 7, reference numerals of second embodiment has applied the identical numerals of the first embodiment. The stator 30, the first Hall sensor 40, the second Hall sensor 41, and the rotor 50 of the second embodiment has the similar configuration and same function as the first embodiment and the detailed descriptions are omitted.

Referring to FIGS. 6 and 7, a brushless dc motor in accordance with the second embodiment includes a stator 30, a first Hall sensor 40, a second Hall sensor 41, and a rotor 50. The stator 30, an axial winding stator, comprises an upper pole plate 30a, a lower pole plate 30b, eight poles 31, and a driver member 32. In assembling, the pole plates 30a and 30b are attached to either side surface of the stator 30. Consequently, the poles 31 formed by the pole plates 30a and 30b are equally spaced and radially extended from the outer circumference of the stator 30.

Referring again to FIGS. 6 and 7, a driver permanent magnet 51 and a frequency permanent magnet 52 are commonly surrounding an inner circumference of the rotor 50. The pole count of the driver permanent magnet 51 is preferably identical with that of the poles 31, so as to repulse each other to rotate the rotor 50. By contrast, the pole count of the frequency permanent magnet 52, four poles for example, is predetermined and adjustable depending upon necessary pole count.

Referring again to FIG. 7, when the rotor 50 is rotated around the stator 30, the first Hall sensor 40 is detected the change of the driver permanent magnet 51 while passing it. Synchronously, the second Hall sensor 41 is detected the change of the frequency permanent sensor 52 so as to output accurate operational status of the rotor 50 to a computer system.

Figure 2:
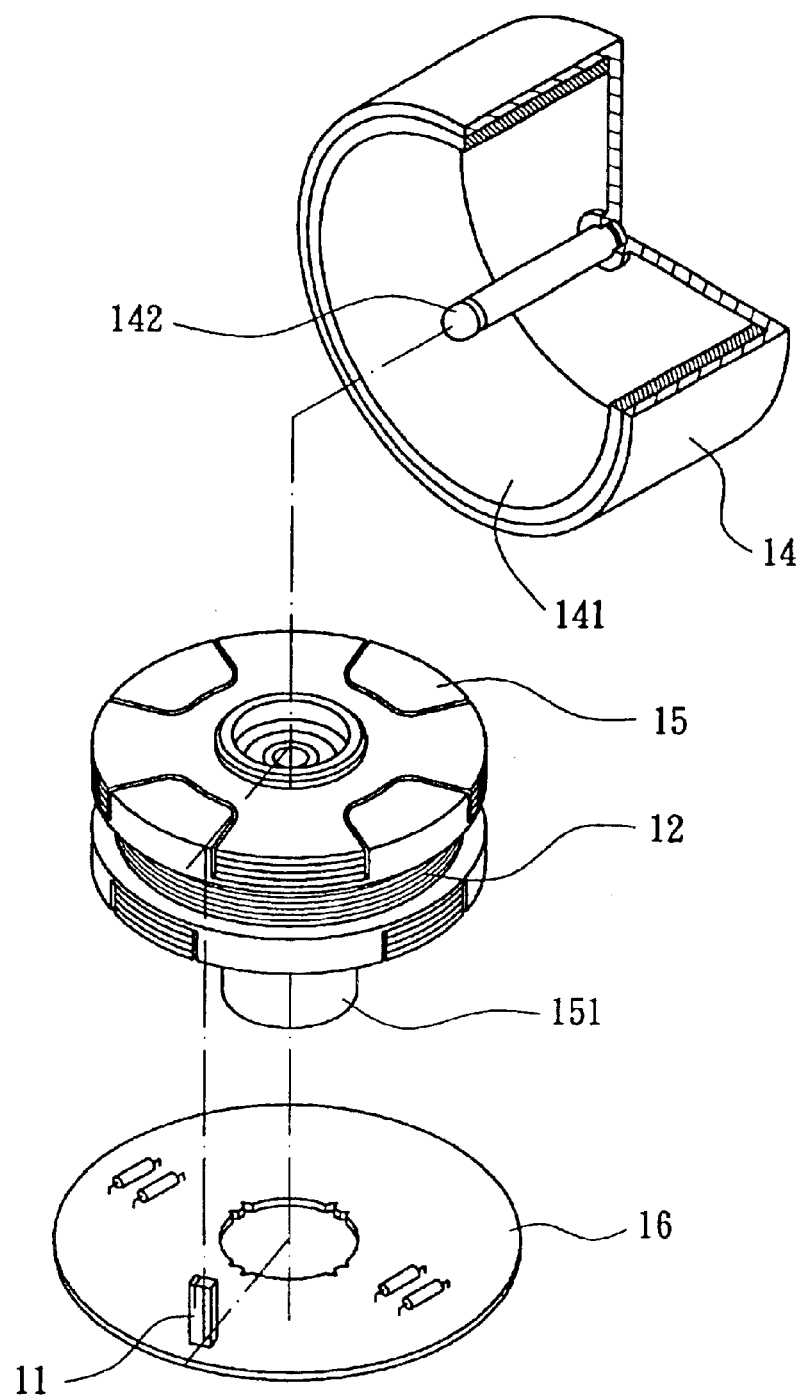
FIG. 2 is an exploded perspective view of a brushless dc motor in accordance with the prior art.

The conventional brushless dc motor added an additional member of the frequency divider IC 13 must increase overall cost, as shown in FIGS. 1 and 2. By contrast, the second Hall sensor 41 of present invention replaces the conventional frequency divider IC 13 to thereby reduce overall cost for manufacture.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A brushless dc motor comprising:

a stator having a plurality of poles and a driver member;

a first Hall sensor electrically connected to the driver member;

a second Hall sensor electrically connected to the driver member; and a rotor axially combined with the stator and comprising a driver permanent magnet and a frequency permanent magnet, said driver permanent magnet and frequency permanent magnet each having a plurality of alternating opposite poles;

wherein when the rotor is rotated about an axis of the stator, the first Hall sensor detects a first alternation of the poles of the driver permanent magnet to thereby alternatively actuate the poles of the stator, and wherein the second Hall sensor detects a second alternation of the poles of the frequency permanent magnet to detect changes in a frequency of said second alternation, said detected changes in the frequency of said second alternation being output to a computer system, for use by the computer system as a reference.

2. The brushless dc motor as defined in claim 1, wherein the stator is a radial winding stator.

3. The brushless dc motor as defined in claim 1, wherein the stator is an axial winding stator comprising an upper pole plate and a lower pole plate which are attached to either side of the stator to form the poles.

4. The brushless dc motor as defined in claim 1, wherein the first Hall sensor is fixed upright with respect to a surface of the driver member.

5. The brushless dc motor as defined in claim 1, wherein the second Hall sensor is fixed horizontal with respect to a surface of the driver member.

6. The brushless dc motor as defined in claim 1, wherein the driver permanent magnet and the frequency permanent magnet commonly surround an inner circumference of the rotor aligned with the first and second Hall sensors respectively.

7. The brushless dc motor as defined in claim 1, wherein a number of said alternating opposite poles of the frequency permanent magnet is greater than a number of said alternating opposite poles of the driver permanent magnet.

8. The brushless dc motor as defined in claim 1, wherein the first Hall sensor is fixed upright with respect to a surface of the driver member, and the second Hall sensor is fixed horizontal with respect to a surface of the driver member.

* * * * *